March 2, 1943. W. J. PHANEUF 2,312,929
ROUGHING BROACH
Filed April 28, 1941
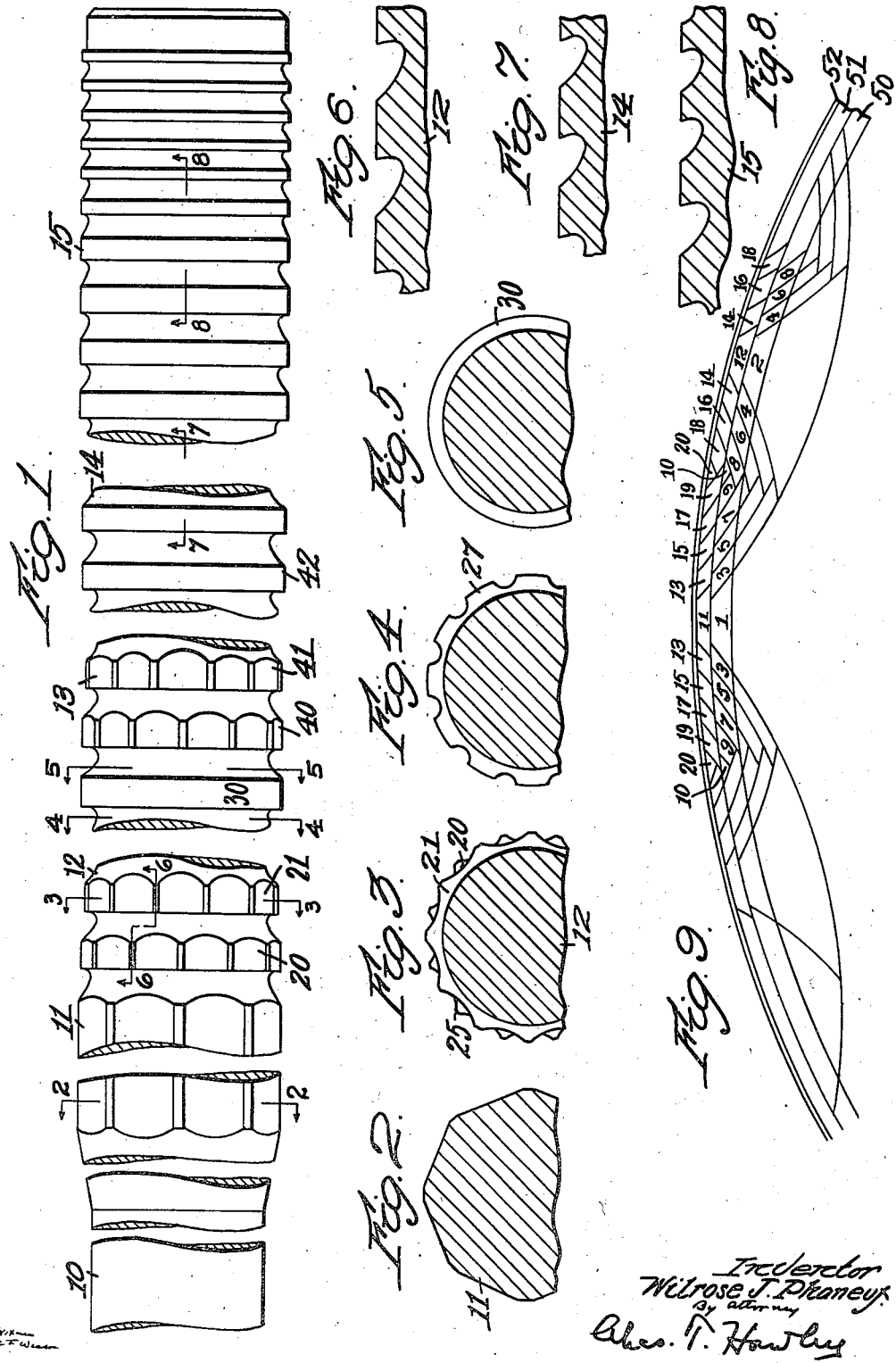

Patented Mar. 2, 1943

2,312,929

UNITED STATES PATENT OFFICE 2,312,929

ROUGHING BROACH

Wilrose J. Phaneuf, Hudson, Mass., assignor to The Lapointe Machine Tool Company, Hudson, Mass., a corporation of Maine Application April 28, 1941, Serial No. 390,844

1 Claim. (Cl. 29—95.1)

This invention relates to the production of finished holes in metal parts by passing a broach therethrough.

It is the general object of my present invention to provide a broach by which a first or roughing cut may be easily and accurately performed.

In the preferred form, I also provide a broach having finishing units, so that a finished hole may be produced by a single broaching operation, but a separate finishing broach may be used when advisable.

To the accomplishment of this general object, I provide a broach having two series of cutting units, with the teeth of each unit arranged in alternate axial rows and progressively increased in width in the order of cutting. The teeth of the first series are preferably all of substantial uniform diameter, and the teeth of the second series are also preferably all of uniform but substantially greater diameter.

With this construction and arrangement of cutting teeth, I avoid side twist during a broaching operation, and I cause all of the teeth to remove portions of stock of substantial thickness and of approximately uniform cross section.

My invention further relates to arrangements and combinations of parts which will be hereinafter described and more particularly pointed out in the appended claim.

A preferred form of the invention is shown in the drawing, in which

Fig. 1 is a side elevation of my improved broach, with parts broken away to reduce the length;

Figs. 2, 3, 4 and 5 are partial sectional views, taken along the lines 2—2, 3—3, 4—4 and 5—5 respectively in Fig. 1;

Figs. 6, 7 and 8 are partial longitudinal sections, taken along the lines 6—6, 7—7 and 8—8 in Fig. 1 respectively; and Fig. 9 is an enlarged diagrammatic sectional view, showing the manner in which the stock is removed by the successive cutting elements.

Referring to the drawing, the broach herein shown is designed for the broaching of round holes, but it will be understood that my invention is not limited to round broaches but is equally applicable to broaches of elliptical or other noncircular contour.

My improved broach, in the preferred form shown in Fig. 1, comprises a shank 10, a pilot portion 11, a first cutting portion 12, a second cutting portion 13, a sizing portion 14 and a finish portion 15. All of these parts are preferably formed as a single tool, but the sizing portion 14 and finish portion 15 may be formed as a separate finish broach where the size of the hole or the nature of the material makes a separate finish operation desirable.

The shank portion 10 is machined to fit the usual puller head of a broaching machine. The pilot portion 11 may be of any desired shape but is shown herein as octagonal, with substantial clearance between the guiding surfaces or flats.

The first cutting portion 12 comprises a successive series of axially alternating cutting units 20 and 21. The teeth of all of the cutting units 20 are disposed in axial alignment and increase progressively in cutting width, and the teeth of all of the alternating cutting units 21 are similarly disposed in axial alignment and similarly increase in width but are removed angularly or offset one-half space from the teeth of the units 20.

Fig. 3 shows this offset angular relation of the teeth of the cutting units 20 and 21. Comparison of the teeth 25 of the first cutting unit 20 shown in Fig. 3 with the teeth 27 of the last unit 21 shown in Fig. 4 illustrates the progressive increase in width of the teeth in successive cutting units. The last cutting unit of the cutting portion 12 is preferably a circular cutter 30 (Figs. 1 and 5).

The periphery of each cutting unit is cut away to provide a relatively deep concave recess between each pair of adjacent cutting teeth. The advantages arising from the use of these deeply concave recesses are fully set forth in my copending application Serial No. 390,845 filed April 28, 1941.

This circular cutter 30 is followed by the second cutting portion 13 which comprises alternating cutting units 40 and 41 having the same arrangement and offset relation as the units 20 and 21 previously described.

All of the cutting units in the portion 12 are of substantially the same outside diameter as the circular cutting element 30, and all of the cutting units in the portion 13 are of the substantially increased outside diameter of the second circular cutting units 42. The actual difference in outside diameter of the two cutting portions will vary for different sizes of holes and for different materials, but in an illustrative example the circular unit 42 is 0.045" greater than the unit 30.

The teeth in the sizing portion 14 are of circular outline and increase progressively in diameter by steps of one to two thousandths.

The circular units of the finish portion 15 are preferably of uniform diameter throughout and are adapted to clear and smooth the finished hole. The circular units may be nicked in staggered arrangement in the sizing portion 14 and finish portion 15 to break up the chips if so desired, and as is usual in the broaching art.

Preferred profiles of the cutting teeth in the different sections are indicated in Figs. 6, 7 and 8, but these profiles may be varied to suit different operative conditions.

The operation of the broach herein described will be most clearly understood by reference to Fig. 9, in which the portions of stock successively removed by two adjacent rows of cutting teeth are numbered in the order in which they are removed.

The portion of stock 1, for instance, is removed by a tooth of the first cutting unit 20, the portion 2 by a tooth of the first cutting unit 21, the two portions 3 at the side of the portion 1 by a wider tooth of the second cutting unit 20, the portions 4 by a wider tooth of the cutting unit 21, and so on successively until the circular cutting unit 30 removes the final portions of stock 10 in the band or layer 50 of material which constitutes the first cut as performed by the cutting portion 12 of the broach.

A band 51 is then removed by the units 40 and 41 in the second cutting portion 13 of the broach, with a portion of stock 11 removes by a tooth of the first cutting unit 40, a portion 12 by a tooth of the first cutting unit 41, and so on progressively until the stock portions 20 are removed by the second circular cutting unit 42, thus completing the second cut and entirely removing the layer 51.

The circular cutting units of the sizing portion 14 then slightly increase the diameter of the hole by removing the successive thin layers of stock indicated collectively and in exaggerated form by the numeral 52.

Careful inspection of Fig. 9 will show that each tooth of each cutting unit 20, 21, 40 and 41 removes a portion or portions of stock of substantial radial thickness and also of substantial circumferential width, and will also show that the stock removed by each tooth is in general of corresponding cross section.

The removal of stock in limited areas of substantial width and thickness is much more effective than removing stock in very thin successive layers, particularly when broaching cored holes having a more or less chilled skin or outer surface. It is furthermore of substantial advantage that the cutting teeth are disposed in axial succession, so that the broaching operation does not tend to twist the broach in the broach head nor to turn the work in the work holder.

Having thus described my invention and the advantages thereof, I do not wish to be limited to the details herein disclosed, otherwise than as set forth in the claim, but what I claim is:

A roughing broach comprising a first cutting portion having a first plurality of cutting units with teeth in axial alignment and a second plurality of cutting units alternating with the units of said first plurality and with teeth axially aligned but offset one-half tooth space from the teeth of the units in said first plurality, all of the teeth in said first cutting portion being of substantially uniform external diameter but said teeth being of progressively increased width, and a second cutting portion having a first plurality and an alternating second plurality of cutting units with teeth axially aligned and relatively offset as in said first cutting portion, all of the teeth in said second cutting portion increasing progressively in width and all being of substantially the same external diameter and of substantially greater diameter than the teeth in the first cutting portion.

WILROSE J. PHANEUF.